United States Patent
Garland

(10) Patent No.: US 9,046,995 B2
(45) Date of Patent: Jun. 2, 2015

(54) EDITING OF TWO DIMENSIONAL SOFTWARE CONSUMABLES WITHIN A COMPLEX THREE DIMENSIONAL SPATIAL APPLICATION AND METHOD

(75) Inventor: Harry B. Garland, San Franciso, CA (US)

(73) Assignee: ON24, INC., San Francisco, CA (US)

( * ) Notice: Subject to any disclaimer, the term of this patent is extended or adjusted under 35 U.S.C. 154(b) by 1027 days.

(21) Appl. No.: 12/421,367

(22) Filed: Apr. 9, 2009

(65) Prior Publication Data
US 2010/0262950 A1 Oct. 14, 2010

(51) Int. Cl.
*G09G 5/00* (2006.01)
*G06F 3/0484* (2013.01)
*G06F 9/44* (2006.01)
*G06Q 10/00* (2012.01)
*G06T 19/20* (2011.01)

(52) U.S. Cl.
CPC ........ *G06F 3/04845* (2013.01); *G06F 3/04847* (2013.01); *G06F 8/20* (2013.01); *G06Q 10/00* (2013.01); *G06T 19/20* (2013.01); *G06T 2200/24* (2013.01)

(58) Field of Classification Search
CPC .. G06F 3/04815–3/04897; G06F 2203/04802; G06F 17/30061
USPC ........... 717/101–178; 715/200–978; 716/132; 703/1; 700/98; 326/41; 345/6, 345/418–420, 427, 522, 664; 707/E17.013
See application file for complete search history.

(56) References Cited

U.S. PATENT DOCUMENTS

| | | | | |
|---|---|---|---|---|
| 5,680,619 A | * | 10/1997 | Gudmundson et al. | 717/108 |
| 5,748,185 A | | 5/1998 | Stephan et al. | |
| 5,815,154 A | * | 9/1998 | Hirschtick et al. | 715/853 |
| 5,838,973 A | * | 11/1998 | Carpenter-Smith et al. | 717/105 |
| 6,628,279 B1 | | 9/2003 | Schell et al. | |
| 6,629,065 B1 | * | 9/2003 | Gadh et al. | 703/1 |
| 6,842,175 B1 | * | 1/2005 | Schmalstieg et al. | 345/427 |
| 7,062,722 B1 | * | 6/2006 | Carlin et al. | 715/850 |
| 7,079,990 B2 | * | 7/2006 | Haller et al. | 703/2 |
| 7,441,201 B1 | * | 10/2008 | Printezis | 715/762 |
| 7,712,052 B2 | * | 5/2010 | Szeliski et al. | 715/854 |
| 2002/0065635 A1 | | 5/2002 | Lei et al. | |
| 2002/0107673 A1 | * | 8/2002 | Haller et al. | 703/1 |
| 2003/0025650 A1 | * | 2/2003 | Uesaki et al. | 345/6 |

(Continued)

FOREIGN PATENT DOCUMENTS

WO WO 02093352 A1 * 11/2002
WO WO 02097616 A1 * 12/2002

OTHER PUBLICATIONS

3D Object Modeling and Recognition Using Local Affine-Invariant Image Descriptors and Multi-View Spatial Constraints—Fred Rothganger and Svetlana Lazebnik; Jean Ponce-Department of Computer Science and Beckman Institute, University of Illinois-Cordelia Schmid Inria, France-International Journal of Computer Vision 66(3), 231-259, 2006.*

(Continued)

*Primary Examiner* — Lewis A Bullock, Jr.
*Assistant Examiner* — Francisco Aponte
(74) *Attorney, Agent, or Firm* — DLA Piper LLP (US)

(57) ABSTRACT

A set of methods and tools are described that permit a user to interact with a two dimensional (2D) photograph or image as if photograph or image is a three dimensional (3D) image of photograph.

14 Claims, 12 Drawing Sheets

(56) References Cited

U.S. PATENT DOCUMENTS

| | | | |
|---|---|---|---|
| 2003/0071810 A1* | 4/2003 | Shoov et al. | 345/420 |
| 2005/0093860 A1* | 5/2005 | Yanagisawa et al. | 345/419 |
| 2005/0212797 A1* | 9/2005 | Lee et al. | 345/419 |
| 2006/0150149 A1* | 7/2006 | Chandhoke et al. | 717/109 |
| 2007/0055401 A1* | 3/2007 | Van Bael et al. | 700/98 |
| 2007/0192727 A1* | 8/2007 | Finley et al. | 715/781 |
| 2007/0211065 A1* | 9/2007 | Feth et al. | 345/522 |
| 2008/0028341 A1* | 1/2008 | Szeliski et al. | 715/854 |
| 2009/0066366 A1* | 3/2009 | Solomon | 326/41 |
| 2009/0217187 A1* | 8/2009 | Kendall et al. | 715/765 |
| 2010/0037205 A1* | 2/2010 | Maillot et al. | 717/109 |

OTHER PUBLICATIONS

Efficient 3D shape matching and retrieval using a concrete radialized spherical projection representation—Panagiotis Papadakis, Ioannis Pratikakis, Stavros Perantonis, Theoharis Theoharis -Greece—Pattern Recognition 40 (2007)—ScienceDirect.*

PCT/US2010/030616 International Search Report dated Jun. 1, 2010.

PCT/US2010/030616 Written Opinion dated Jun. 1, 2010.

Extended European Search Report of EP 10762532.9; dated Jun. 5, 2012.

* cited by examiner

Exhibit A. Anticipated Workflow when using this invention.

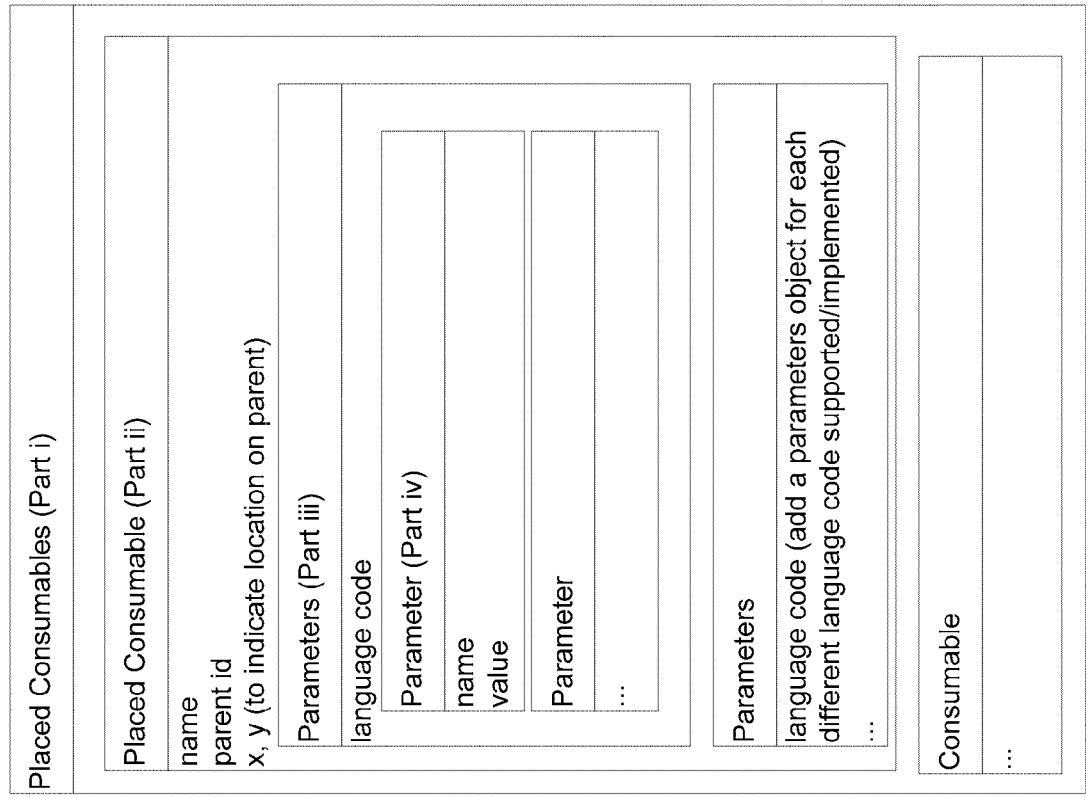
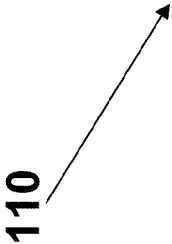
FIGURE 11

EDITING OF TWO DIMENSIONAL SOFTWARE CONSUMABLES WITHIN A COMPLEX THREE DIMENSIONAL SPATIAL APPLICATION AND METHOD

FIELD

The disclosure relates to the development and maintenance of three dimensional (3D) software applications and in particular to a system and method that enables users without any skills specific to 3D software to edit 3D content.

BACKGROUND

Today, software application development is a combination of software development and artwork development. When creating applications that represent virtual environments, it is common for the artwork to be created using a 3D drawing tool, and then saved as a rasterized flat file, which is used as the background image of an application. The problem is that the application remains unaware of the 3D projection matrix of the image, and without further data, it can only add user interface features to a flat, 2D screen. Thus, it is difficult to organize 2D content in 3D space. Furthermore, most software applications use 2D coordinates to express the positioning of all its consumables and within this coordinate system, it is not clear how a software developer (a "technical user") can organize its placement in a 3D environment in a way where the consumables can be organized by a person not trained in the art of 3D drawing (a "business user"). For example, a person who is not trained in the art of 3D drawing may not understand the details of how to place content into a 3D virtual environment. For the Business User to be able to place content, the Business User would need to learn how the projection matrix works and how a 3D coordinate system works and 3D tools today also require the user to be define at least one 3D rotational coordinate which requires training. It is desirable to provide a system and method that allows a business user to be able to place content in a 3D environment without having to learn 3D drawing tools, etc.

In order to create a 3D spatial application, it requires a highly qualified engineer to be intimately involved in the construction of each application. Alternatively, a business user can be trained to use programming language tools to be self sufficient, however it is a struggle for the business user to learn all the aspects of the programming language necessary to complete the task. In addition, when the technical user is assigned to create the 3D application, the workflow between the business user and technical user can be difficult because the business user usually needs to explain the requirements to the technical user and the technical user must then implement the requirement. This means that the business user is not self-sufficient and there can be subtleties lost in the translation when talking to the technical user. In today's world, the consumer (a "software customer") who requires that a 3D application be created for them often needs software created faster than a programming team can build it due to the limited number of skilled professionals trained in the specialized art of 3D application design and development. For these additional reasons, it is desirable to provide a system and method that allows a business user to be able to place content in a 3D environment without having to learn 3D drawing tools, etc.

To further complicate the development of 3D applications, in order to position 3D elements in space, there are 6 significant variables. However, the most common input device, a mouse, can only fluidly control 2 coordinates at a time (x and y) which makes the development of 3D applications more difficult.

In the past, people have organized 2D content in 3D space by using a 3D editing tool, lining up the content so that it matches the 3D background, and placing the content on top of the 3D background. However, the 3D editing tool requires training so that a typical business user is unable to organize 2D content in 3D space using these typical techniques. The most common way for a non-technical business user to edit 3D content is for a programmer to set it up once, then the user can edit its parameters. However, the parameters are predetermined by the programmer so it is not an ideal solution.

An existing solution to position and rotate 3D elements in space is to allow motion drag on 2 dimensions at a time, then make the user rotate the camera in order to access parts of the 3rd dimension. To rotate elements in space, it is typical to put 3 circles on the screen near the object being positioned, and let the user drag each of those circles. However, this does not fully solve the problem of placing content in a 3D environment because the user has to rotate the world around to access all spatial dimensions and it requires training to use.

Another typical technique to rotate 3D elements in space is to use a 6-axis input device, known as a 3D mouse. This doesn't fully solve the problem of placing content in a 3D environment because most people don't have this input device, so only a specialized subset of people can use this device.

Currently, it takes trial and error to position a single 3D Consumable and the user has to tweak the positioning of each and every consumable that gets added. This is difficult because there are 6 variables that must simultaneously be adjusted (x, y, z, $\theta x$, $\theta y$, and $\theta z$). Therefore it fails to be practical for creating a lot of content in a short period of time. Thus, it is desirable to provide a system and method for placing content in a 3D environment wherein the user does not need to be intimately familiar with 3D tools and it is to this end that the system and method are directed.

BRIEF DESCRIPTION OF THE DRAWINGS

FIGS. 10 and 11 illustrate an object model of the system for placing content in a 3D environment.

DETAILED DESCRIPTION OF ONE OR MORE EMBODIMENTS

The system and method are particularly applicable to an event presentation system such as that provided commercially by On24, Inc. and it is in this context that the system and method will be described. It will be appreciated, however, that the system and method has greater utility since the system and method can be used with any system in which it is desirable to be able to place content in a 3D environment wherein the user does not need to be intimately familiar with 3D tools.

Figure 3:
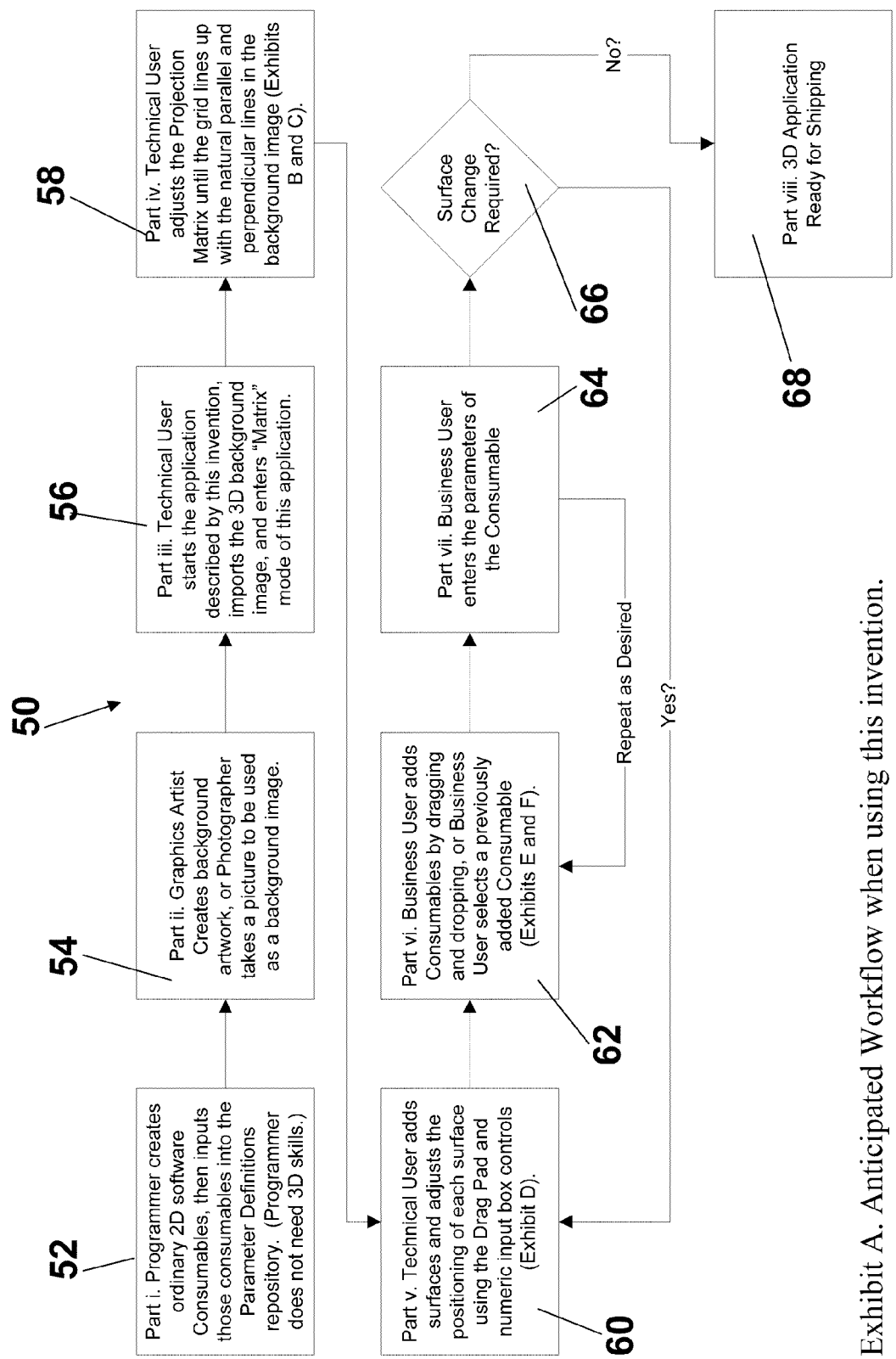
FIG. 3 illustrates an example of a method workflow of a method for placing content in a 3D environment.

In addition to the system described below with is an implementation of the system, the system also can be used in combination with the following systems: 1) workflow systems (a system that requires certain data points to be completed before allowing the next part of the system to run) that is useful in ensuring that the workflow as shown in FIG. 3 occurs in the sequence in which it is described; 2) permission systems (a system to disallow users from accessing parts of this tool that is unnecessary for their role) which is particularly useful in restricting users to their corresponding parts in the workflow shown in FIG. 3; 3) source-control and "wiki-like" systems (check-in/check-out, revert changes, compare changes, etc.) to manage the development of the 3D application and the consumables; 4) collaboration Tools to enable multiple users to interact with each other while editing the 3D application project in real time; 5) Timeline and tweening system to enable slide shows, rich media presentations, and animations to be predefined and/or in combination with user interaction. For example, a software consumable can (without being limited to) fade in, move in, or zoom in. Also for example, a sophisticated system can be developed which defines a specific sequence of many Consumables coming in and out of view triggered by specific time markers on a timeline; and 6) software module loading to enable only the Consumables that are in use to be loaded at runtime. For example, if the software programmer has made available a particular Consumable (FIG. 3, process 52), and the Business User never chooses to add that particular Consumable (FIG. 3, process 62), then the runtime application created (FIG. 3, process 68) will not load the Class defined by the programmer (FIG. 3, process 52) thereby minimizing the size of the application and reducing unnecessary bandwidth and load time when the runtime application executes.

Figure 1:
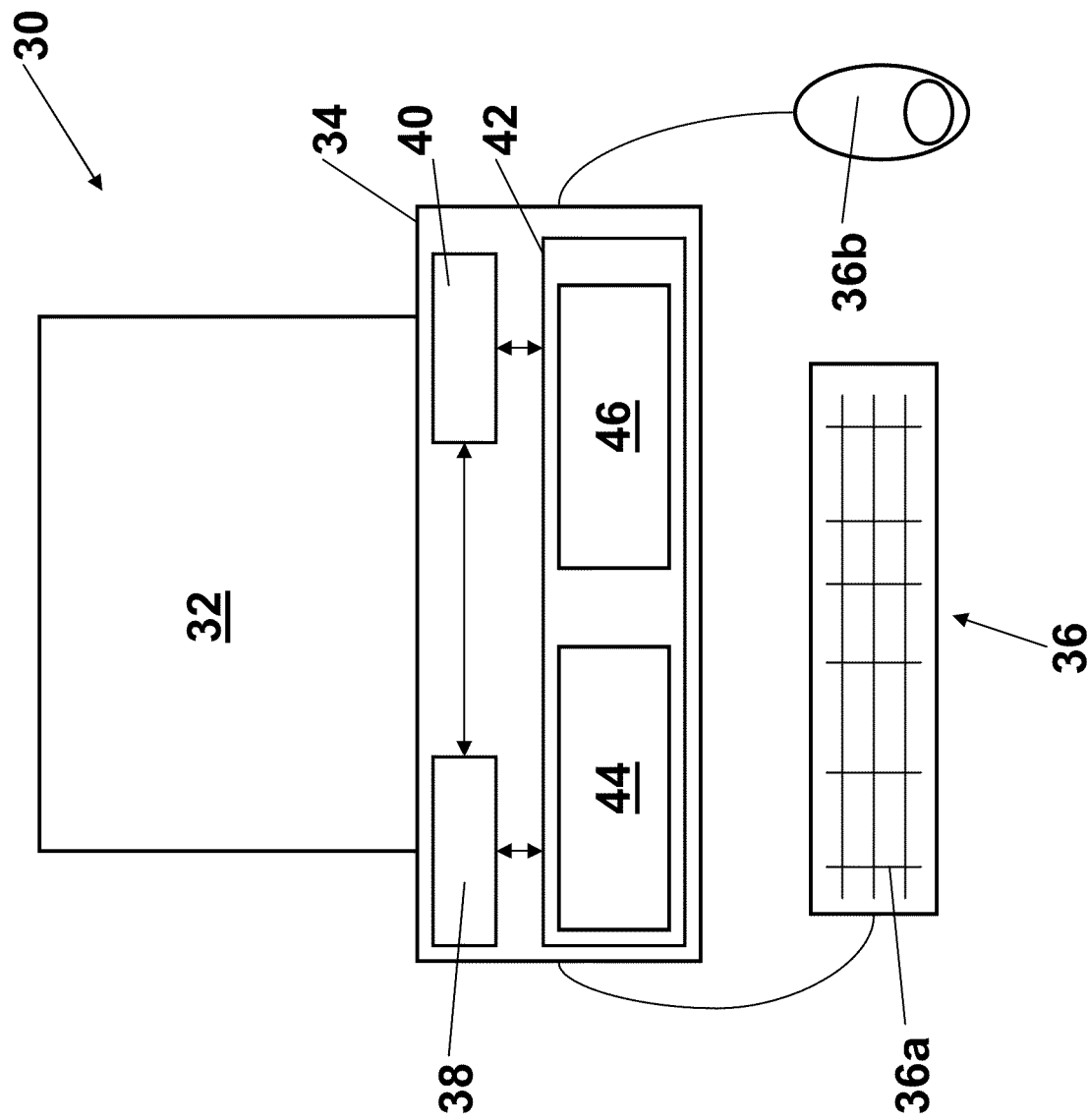
FIG. 1 illustrates an example of a computer based implementation of the system and method for placing content in a 3D environment.

FIG. 1 illustrates an example of a computer based implementation of a system 30 and method for placing content in a 3D environment. The system 30 may be implemented on any processing unit-based system, such as, for example, a computer system such as is shown in FIG. 1 that executes a plurality of lines of computer code. The system may also be implemented in hardware (an integrated circuit based system), software (a plurality of lines of computer code residing on a storage device, such as a DVD, CD, flash memory, etc.) or with a combination of software and hardware as shown in FIG. 1. The system may also be implemented on a server computer or in a hosted model in which the functions of the system are delivered to a user over a link such as the Internet.

The implementation shown in FIG. 1 may include a display device 32, a chassis 34 and one or more input/output devices 36 that allow a user to interact with the system. For example, the one or more input/output devices may include a keyboard 36a and a mouse 36b (shown in FIG. 1) and other input/output devices not shown in FIG. 1, but well known. The chassis 34 (that may be a chassis of a personal computer or a server computer, but may also be a casing of a notebook computer) may house a processing unit 38 that executes computer instructions, a persistent storage device 40 that stores software or an operating system, such as a hard disk drive, flash memory, an optical disk drive, etc and a memory 42 that stores a plurality of lines of computer code that are being executed by the processing unit, such as dynamic random access memory or static random access memory, that are all electrically connected to each other and are able to communicate with each other.

When the processing unit-based system is being used to implement the system and method for placing content in a 3D environment, the memory 42 may store an operating system 44 and a tool 46 (that may be known as a construction application in one embodiment) that comprises a plurality of lines of computer code that implements the system and method for placing content in a 3D environment.

Figure 2:
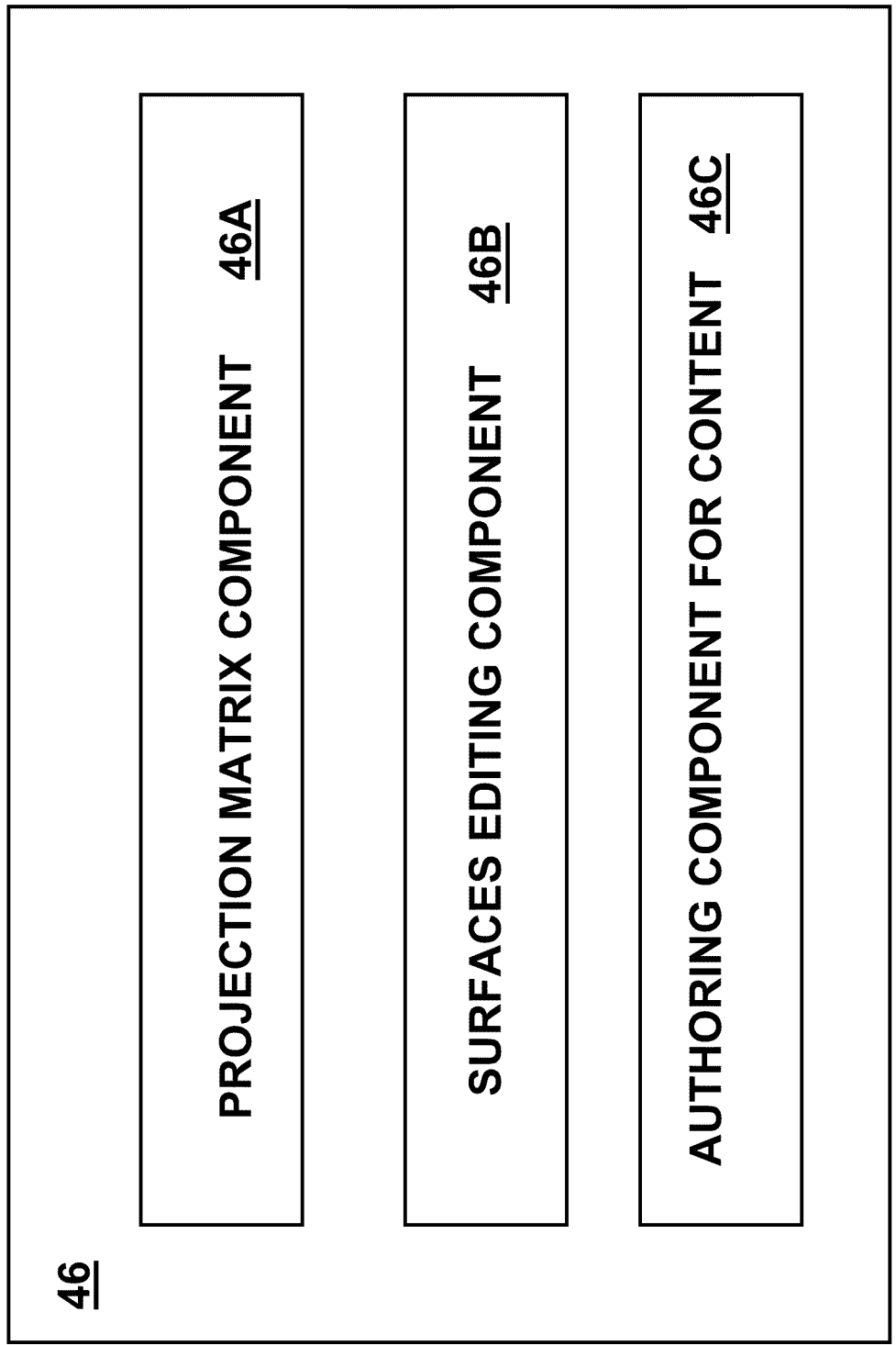
FIG. 2 illustrates more details of the tool for placing content in a 3D environment as shown in FIG. 1.

FIG. 2 illustrates more details of the tool 46 for placing content in a 3D environment as shown in FIG. 1. The tool 46 may be used by a technical user (who has the skills to create and/or edit a 3D environment) as well as a business user (who can place content onto the 3D environment). The content may be, in one embodiment, software consumables, a static piece of content, such as plain text or an image, or a dynamic piece of content, such as an interactive widget or a component of the software application being built using the tool. The tool 46 may include a projection matrix component 46a that allows a projection matrix (described below in more detail) identified and editing as needed, a surfaces editing component 46b that allows a technical user to add, move, edit and/or delete surfaces of the 3D environment and an authoring computer 46c for content that allows a business user to add, move, edit or delete a piece of content such as a software consumable. Now, a method for placing content in a 3D environment is described in more detail.

Figure 4:
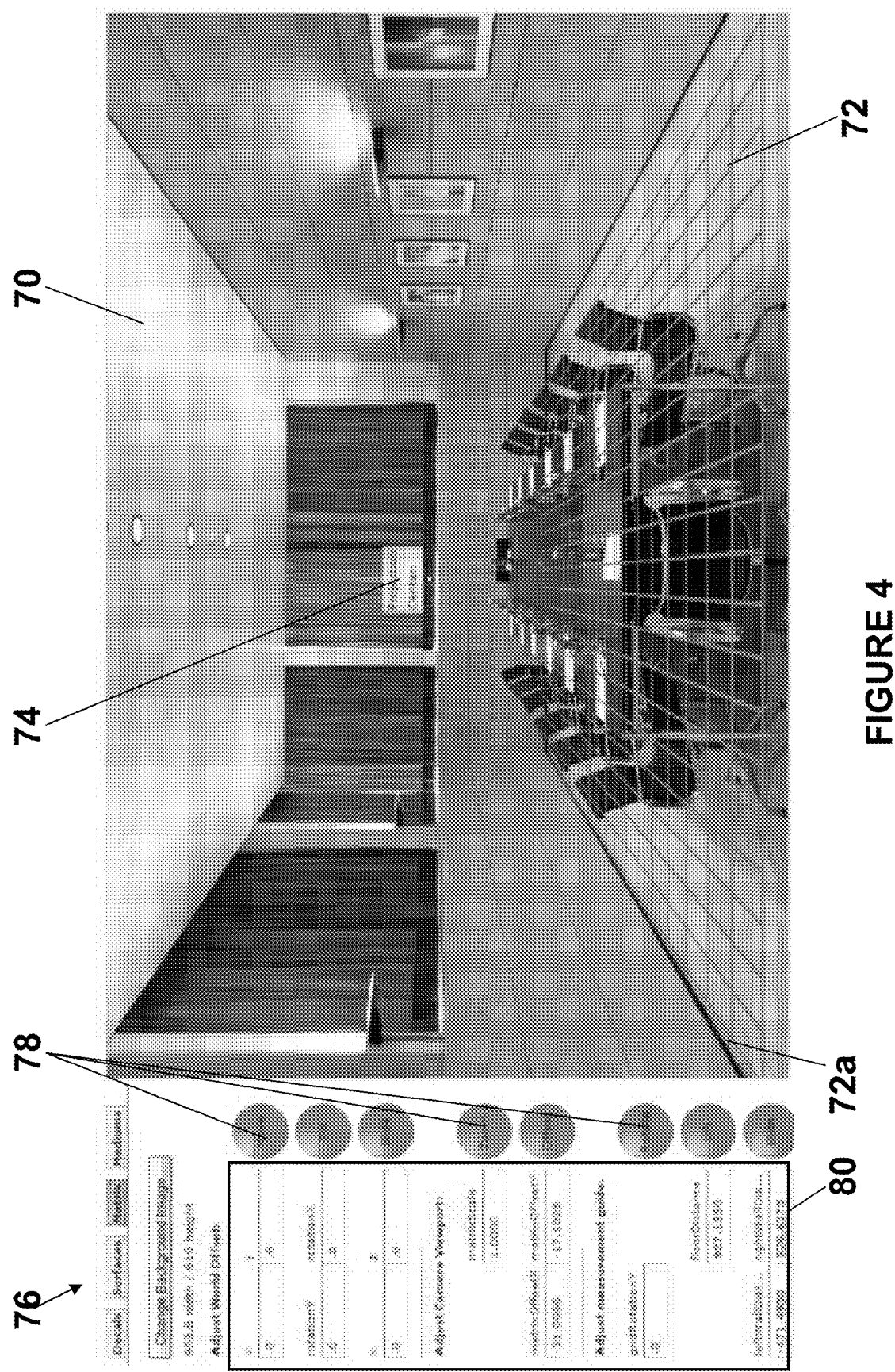
FIG. 4 illustrates an example of a user interface of a matrix process of the method shown in FIG. 2.
Figure 5:
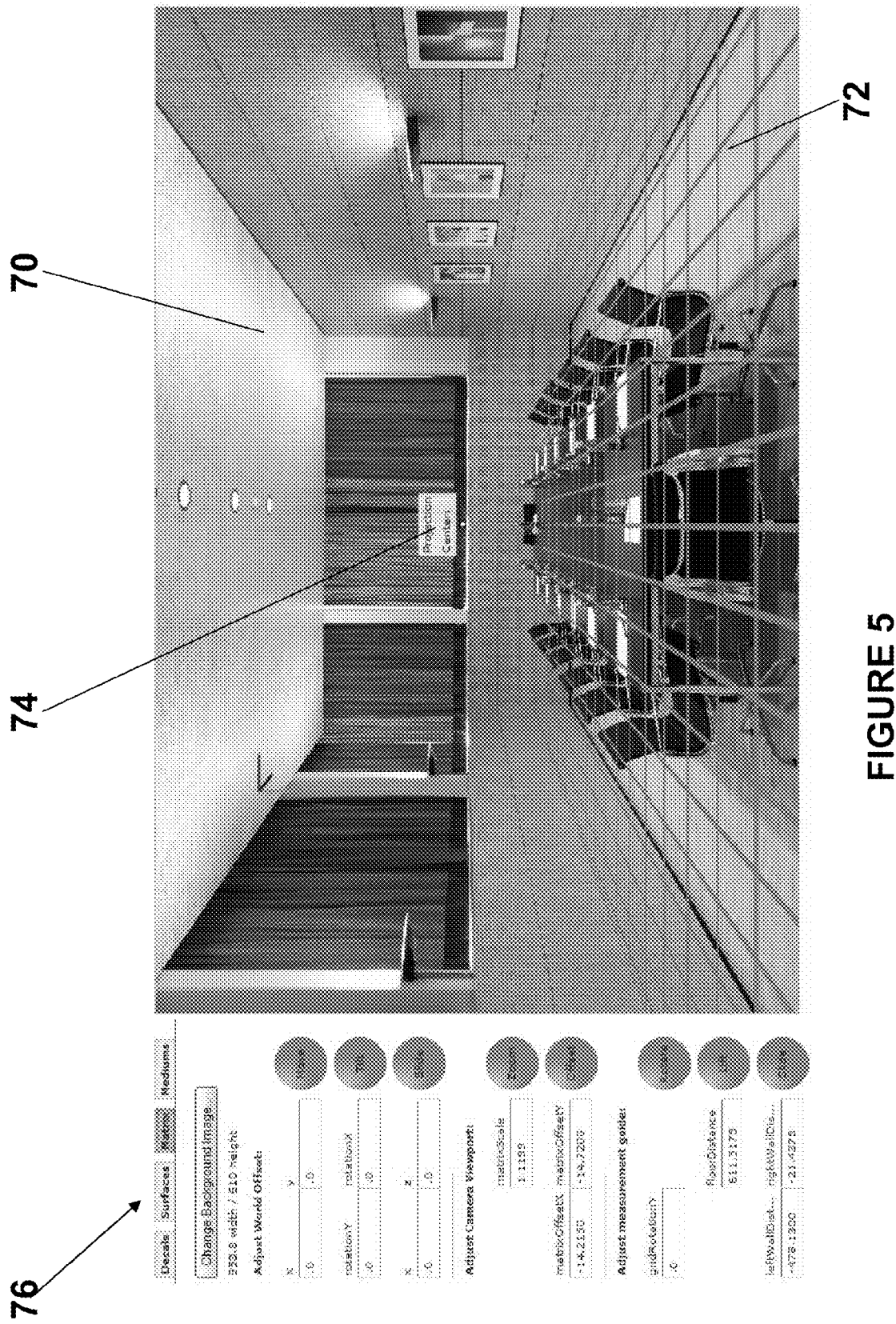
FIG. 5 illustrates an example of a user interface for the adjustment of the projection grid shown in FIG. 4.
Figure 6:
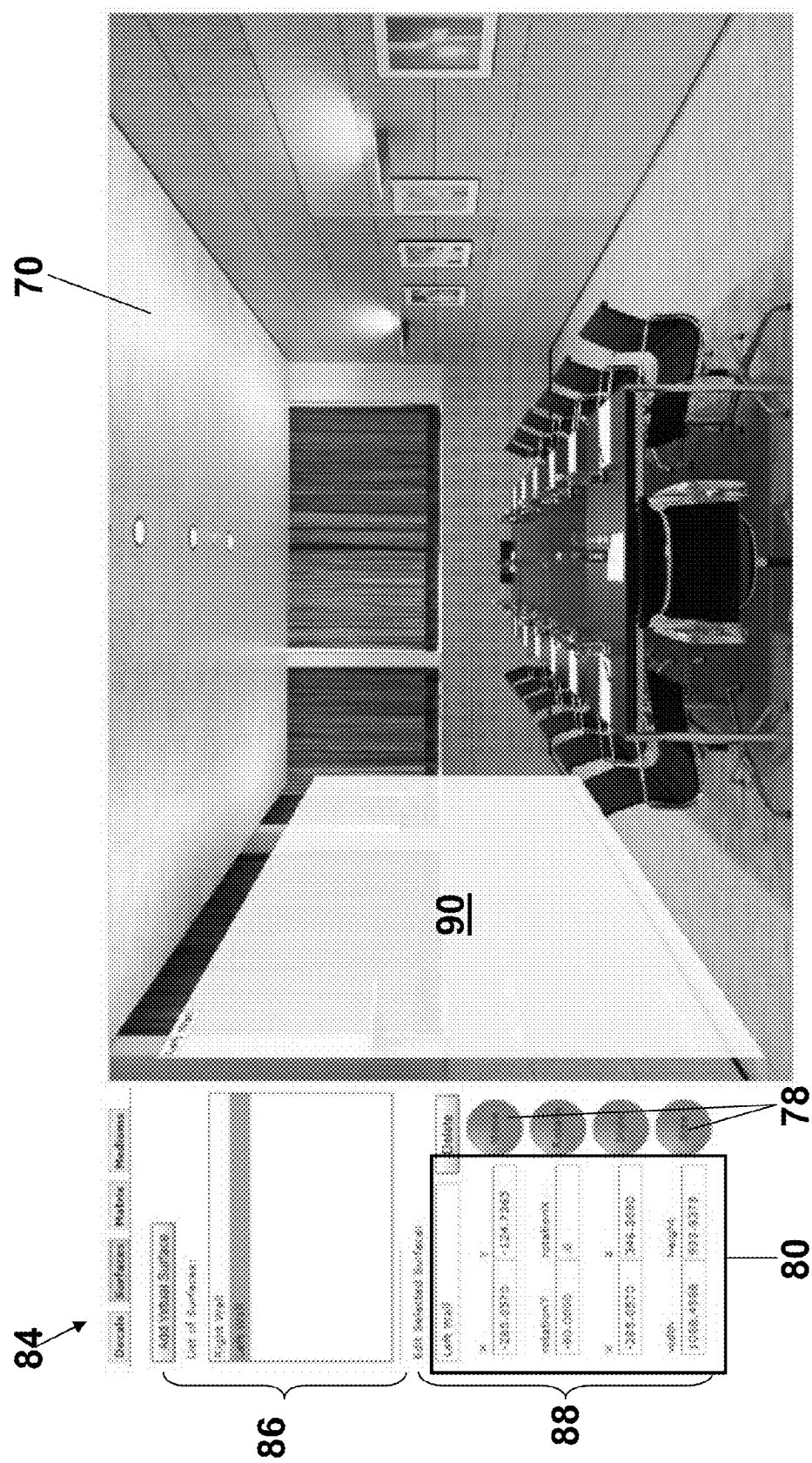
FIG. 6 illustrates an example a user interface for creating, naming and positioning each surface shown in FIG. 4.

FIG. 3 illustrates an example of a method workflow 50 of a method for placing content in a 3D environment. A programmer (who does not need to have 3D skills) may create ordinary 2D software consumables which are then input/stored in a parameter definitions repository (52). The software consumables may be anything that is controlled by software that can be consumed by the end user including anything with a user interface such as a Twitter widget, a data grid, a chat window, rich text or an image to be displayed. The software consumables and synonymous with "software module", "user interface component", "display object", etc. In the system, the content or software consumables may be in any language and the system allows the user to place the content or software consumables into the 3D environment regardless of the language of the content or software consumable. A graphics artist may then create background artwork or a photographer takes a picture to be used as a background image (54). A technical user may then use the tool 46 to import the 3D background image (from the graphics artist or photographer for example) and enters a "matrix mode" of the tool (the projection matrix component 46a) (56). The technical user may then adjust the projection matrix until the grid lines up with the natural parallel and perpendicular lines in the background image (58) as shown in FIGS. 4 and 5 and described below in more detail. The technical user may then add surfaces and adjust the positioning of the surfaces using a user interface, such as a Drag Pad in one implementation, and a numeric input control box (60) as shown in FIG. 6 and described below in more detail.

Figure 7:
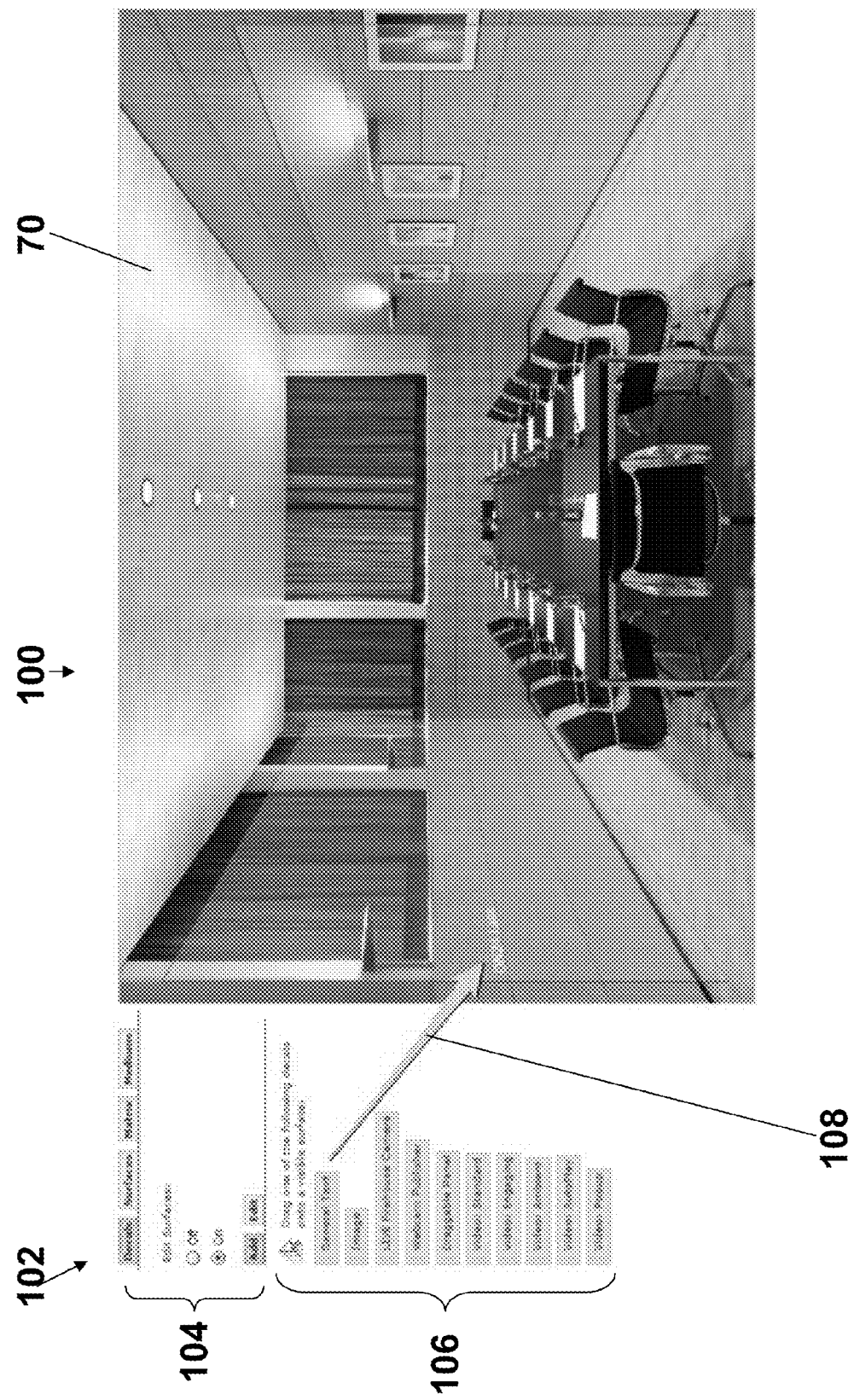
FIGS. 7 and 8 illustrate an example of an interface process of the method shown in FIG. 2.
Figure 8:
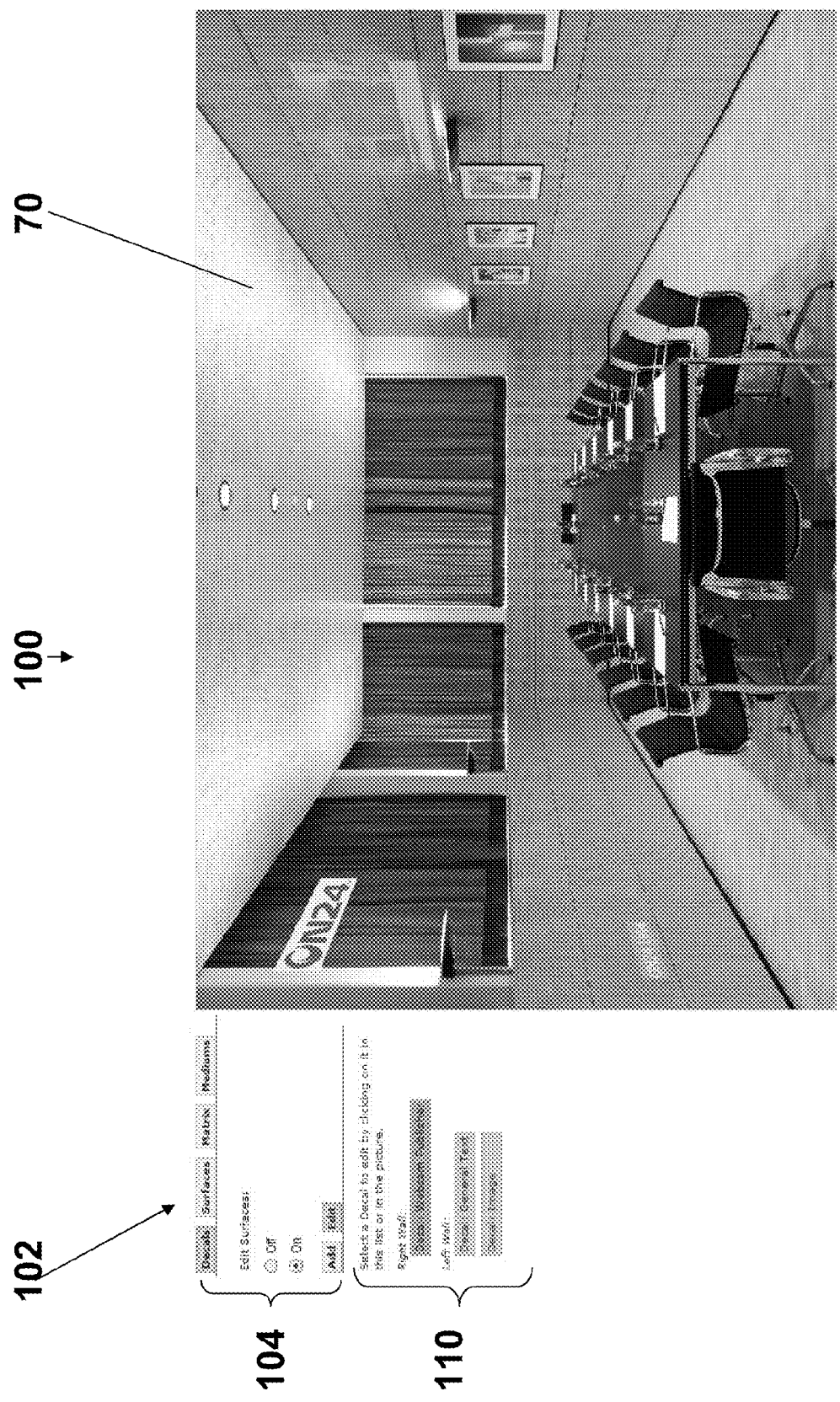

Once the projection matrix and surfaces are set, the business user may then add consumables using a user interface, such as by dragging and dropping icons in one implementation, and/or selects a previously added consumable (62) as shown in FIGS. 7 and 8 and described below in more detail. The business user may then enter the parameters for the new consumable (64) and then repeat adding consumables and enter their parameters as needed to populate the consumables. The system may then determine if any surface changes are necessary (66) as a result of the business user's activities and loops back to process 60 if any surface changes are needed. If no surface changes are needed, then the 3D application with the consumables is ready for shipping (68). The workflow for generating the 3D application with the consumables has been completed. Now, each of the processes described above are described in more detail.

Projection Matrix/Matrix Configuration Mode

A projection matrix is a square matrix (as defined in Mathematics) used in a method of mapping three-dimensional points to a two-dimensional plane. A conceptual aid to understanding the mechanics of this projection involves treating the two dimensional ("2D") projection as being viewed through a camera viewfinder. The camera's position, orientation, and field of view help define the perspective projection matrix. The projection matrix allows a specification of a two dimensional picture as a three dimensional ("3D") object—allowing other systems or programs to then be able to interact with the 2D image as if it were fully 3D.

The projection matrix is used by the system to take 3D artwork and create 3D software using the 3D artwork. To do this, the software has to be calibrated to the same projection matrix as the artwork. When properly calibrated, parallel lines in the application will perfectly overlay parallel lines in the background image.

When the construction application/tool 46 is in the matrix configuration mode (using the projection matrix component 46A), the technical user can adjust the parameters that affect the projection matrix. In order for the Technical User to have clear, understandable parameters to manipulate, the Construction Application uses a system for converting simplified data points into the relatively more complex projection matrix (which is ultimately composed of 16 numbers as a 4×4 matrix grid). The parameters that are controlled by the Technical User, in one embodiment, may include: Matrix Scale, Matrix Offset X, and Matrix Offset Y. These parameters are converted by means of a common Mathematical translation into numeric values for Projection Matrix. This transformation does not preserve or enable user control of all of the numbers involved in the projection matrix, so default values are used for some of the numbers used to construct the Projection Matrix and subsequent clipping and scaling operations. The projection matrix is derived from the camera's X, Y, Z, the camera's rotation X, Y, Z and the viewer's X, Y, Z position relative to the display surface. The subsequent clipping and scaling operations can be derived from (but are not limited to) field of view, near clipping plane and the far clipping plane. For example, the standard "near plane distance" and "far plane distance" components of the projection matrix are set to a reasonable constant value. The purpose of these described methods of simplification is so that a Technical User not skilled in the art of 3D projection matrix manipulation can very quickly understand and manipulate the controls necessary to calibrate the parallel lines in the application with parallel lines in the background image.

Additionally, when the Construction Application is in matrix configuration mode, the user can adjust the offset of the "world", a function that is similar to adjusting the position and rotation of the camera. This effectively adds 6 World Offset numbers (x, y, z, θx, θy, and θz), (controlled directly by the Technical User) to all Surface coordinates.

Additionally, when the Construction Application is in matrix configuration mode, the Technical User can see and manipulate a grid and projection center point that has been overlaid on the stage for the purpose of visual reference. This grid exists for the purpose of assisting the Technical User in lining up parallel lines in the application with parallel lines in the background image. The user can adjust the position and rotation of the grid until specific lines in the grid overlay specific lines in the background image. Adjusting the position of the grid does not affect any of the numbers that are used to compute the final projection matrix; it is only a guide that is transformed by the projection matrix to show parallel and perpendicular lines for the Technical User to make a determination about whether its lines match lines in the background image.

Additionally, when the Construction Application is in matrix configuration mode, additional forms of reference can be added to assist the Technical User in viewing the effects of the projection matrix. There can be multiple intersecting grids on the screen at the same time to assist in lining up multiple surfaces in the background image. There can also be a modified mouse cursor that has 3 lines at 90 degree opposing angles (on the x, y, and z axis), so that the user can quickly hover over an arbitrary point to see how the projection matrix affects the mouse cursor ability to line up with the background image.

There are various techniques that the Technical User can use to perform the alignment. For example, if the perpendicular angles on the grid are more acute than those of the background image, then the Technical User should increase the matrixScale property (causing the projection matrix to zoom in; causing the projection matrix to have a smaller Field of View; causing perpendicular angles to be projected at an angle closer to 90 degrees). In addition, if the perpendicular angles on the grid are more obtuse than those of the background image, then the Technical User should decrease the matrixScale property (causing the projection matrix to zoom out; causing the projection matrix to have a wider Field of View; causing perpendicular angles to be projected at an angle that is more distorted.) As another example, when the background image has 2 natural lines that form a 90 degree angle in space, and the projection of those 2 lines is 180 degrees, and the θy offset is set to 0, then the latitude of those lines represents the y component of the projection center. It is assumed that many other techniques will become evident with specific aspects of specific background images, and the Construction Application specifically enables the discovery of those techniques because it reduces the number of variables that the Technical User is concerned with when constructing the projection matrix.

During the process of aligning the grid to the image, the Technical User specifically looks at the aforementioned factors involving lines in the grid and 3D mouse cursor matching lines in the background image, and intelligently adjusts the numbers (using the drag pads and numeric input controls on the left side of Exhibits 4 and 5) until the grid matches as shown in Exhibit 5. There are specific techniques that the Technical User can apply during this process, such as finding a line in the image that is projected as horizontal, and lining up the Projection Center to that line first, then adjusting the zoom until right-angles match the image.

As shown in FIG. 4 that illustrates an example of a user interface of a matrix process of the method shown in FIG. 2, a 3D picture 70 is shown that has a grid 72 that is overlaid onto the 3D picture 70 during this phase of application creation (FIG. 3, process 56). The user interface also shows a Projection Center point 74. The grid can be colored (and the user may choose a color) so that the grid contrasts best with the background picture 70. The user interface also may include a portion 76 that displays the most common parameters for adjusting the Projection Matrix. In the portion 76, each parameter may have a drag pad 78 and one or more numeric input boxes 80 associated with the particular parameter that allow the user to adjust each parameter of the projection matrix.

The "drag pads" 78 as shown in FIG. 4 enable a user to control the value of variables by making 1 or 2 variables simultaneously draggable by the user, even when such variables are not necessarily draggable by their own nature. To install a drag pad in an application, the programmer places the Drag Pad into the application, and assigns 1 or 2 variables to the particular drag pad to allow the user to manipulate the 1 or 2 variables using the drag pad. When the drag pad is installed (wherein the drag pads are shown installed in FIG. 4) each of these 1 or 2 variables are assigned to either the x component of the drag pad or the y component of the drag pad meaning that the user controls one variable using the top and bottom of the drag pad (the y component) and controls the other variable using the right and left of the drag pad (the x component).

To use a drag pad, the user hovers the cursor (which may be controlled by a mouse for example) over the drag pad on the screen. Then, the user presses down on the mouse and the user moves the cursor to set the rate at which the variables change. Then, moving the cursor to the left of the point at which it was first pressed down will cause the variable assigned to the x coordinate to decrease at a rate proportional to the distance away from the origination point. Similarly, moving the mouse to the right of that point will cause the variable assigned to the x coordinate to increase at a rate proportional to the distance away from the origination point. The left/right movement may be known as a first control axis for the first variable/parameter. Similarly, moving the cursor up and down from the original point will do the same thing, except it will alter the variable assigned to the y coordinate instead of the x coordinate. During the dragging, the pad itself will not move; it will only move the position of element attached to the variables assigned to the x and y components of the drag pad. The up/down movement may be known as a second control axis for the second variable/parameter.

Returning to FIG. 4, the projection matrix is shown in a default position since the Technical User has not yet lined up the grid with the image and the grid lines are not parallel with the natural lines in the image. For example, a far left side of the grid 72*a* intersects (instead of remaining parallel to) the nearby natural black line in the image.

FIG. 5 illustrates an example of the user interface for the adjustment of the projection grid shown in FIG. 4 with the notable difference being that the Technical User has lined up the grid 72 to the image 70 (representing the completion of FIG. 3, process 58). In this Figure, the parameter values of the projection matrix are different in portion 76 reflecting that the grid 72 has been aligned with the image 70 so that parallel lines in the image match parallel lines in the grid and perpendicular lines in the image match perpendicular lines in the grid preserving the projected angle of 90 degree corners. In addition, if the grid were to be raised (by adjusting its y coordinate), the grid lines will continue to be parallel and perpendicular to the appropriate natural lines in the picture. On the ceiling level near the left side of the image, you will notice a 3D widget 82 composed of 3 different lines, each line representing a specific 3D axis (x, y, and z). In one embodiment, this is what a cursor looks like when it is hovered over the picture. As the cursor moves around (such as by an input device such as a mouse, being moved), the 3 lines will always point in the direction that represents the projected angle from that point, thereby enabling the user to hover over specific artifacts of the background image to further ensure that the alignment is proper.

Surfaces/Surface Editing

Returning to FIG. 3, the technical user adds/deletes/modifies surfaces of the image and adjusts the positioning of each surface using a input device, such as a Drag pad, and numeric input box controls as shown in more detail in FIG. 6. In some embodiments of the system, surfaces are defined by a Technical User using the Construction Application prior to the Business User's role in the system (FIG. 3, process 60). A surface is a destination area that a Business User can drag Consumables onto. When the Construction Application/tool 46 is in surface configuration mode (as shown in FIG. 6 using the surface editing component 46B, for example), the Technical User can add, delete, move, and rotate surfaces in the application. In the system, the surfaces are layered in a specific sequence and that sequence determines the order in which surfaces are in front of each other (also known as z-order in computer science).

In the system, a Surface can be a 2D layer and because of the specific z-ordering, a surface can be used to put a masking layer in front of a 3D layer. This masking layer can be an overlay of the background image, so that if the background image contains a foreground feature, that foreground feature will remain on top of the Software Consumables that the Business User drags in under it.

A surface can additionally be defined to have a curvature instead of being flat. The curve can be defined by adding an property to each surface that defines a Bezier curve, circular curve, or other algorithmic curve to conform to a curved surface that appears in the background image. A curve can be defined on its Y axis, X axis, or both.

FIG. 6 illustrates an example of a user interface for creating, naming and positioning each surface shown in FIG. 4. This user interface allows a technical user to create each surface, name each surface, and position each surface so that when Consumables are placed on it, it will appear that the Consumables are being placed directly onto a surface in the background image. The user interface may include the 3D image 70 and a surface editing portion 84. The surface editing portion 84 may further comprise a surface naming and adding portion 86 that allows a user to add/name/select a surface for editing as well as a surface parameter portion 88 (that has the same drag pads 78 and numerical input boxes 80 as described above) that allows the user to adjust the one or more parameters of each surface.

As shown in FIG. 6, when the user selects/adds a surface in the surface naming and adding portion 86, it is synchronized with the 3D image 70 so that a graphical representation of the surface 90 (such as a left wall in this example) appears on top of the image 70. Furthermore, when the user clicks on either the surface 90 or the name of the surface in the a surface naming and adding portion 86, both will be highlighted. When a surface is selected, the details of that surface (as they currently exist) appear beneath the label "Edit Selected Surface" in the surface parameter portion 88. In this state, the user may edit the name and 3D coordinates to position it using the same drag pads 78 and numerical input boxes 80 as described above. Each surface is then used by the business user to position consumables as described below. However, when the 3D application is completed, the surfaces are normally not visible and will not be visible in the Final Application generated by the Construction Application.

Consumables/Editing Consumables

Returning to FIG. 3, a business user may add/delete/edit/move one or more consumables to the 3D environment by dragging and dropping or a business user selects a previously added consumable as shown in FIGS. 7 and 8 (62). The user interface 100 of the consumables editing component may include the 3D image 70 (that has already been aligned with the projection matrix and had surfaces added by the technical user) and a consumables portion 102. The consumables portion 102 may include an edit surface portion 104 (that allows the user to add or edit a surface) and a list of consumables portion 106 that lists a collection of Software Consumable definitions that are defined in advance by a programmer (such as a general text consumable, an image consumable, a video popup consumable, etc). In the system, there is not limit to the kinds of Consumables that can be defined and the system is not limited to the consumables shown in FIG. 7. For example, the programmer of the system that implements the Construction Application may create, without being limited to: Video display, Webcam display, Interactive object, Database-driven datagrids, Draggable Panels, Chat Box, Q&A component using standard client-server architecture, etc.

The list of consumables portion 106 has a drag-and-drop system that enables the Business User to add a new Consumable by dragging a Consumable from the list 106 onto the stage/image 70. The user interface may also include a parameter definition system (not shown in FIG. 7) that enables the programmer of the Consumable to define what the parameters are for that Consumable, and enabling the Business User to fill in the values for that Consumable.

Using the authoring component 46C, a consumable can be placed in such a way that it spans over multiple surfaces. To do this, a system is created that detects adjacent surfaces, and when the Business User places a consumable in such a way that it fits between 2 or more different surfaces, part of the consumable will be placed on one surface, and part on another. In one embodiment using this feature, the placed Consumable data structure (FIG. 11) will contain not just one set of fields: {parent id, x, y}, but an array containing the same fields, and additionally 4 more fields to describe the portion of the cropped placed consumable on each surface, so the new set of fields would be: [{parent id, x, y, cropleft, cropright, croptop, cropbottom}, . . . , . . . ].

FIGS. 7 and 8 illustrate an example of an interface process of the method shown in FIG. 2. FIG. 7 shows the interface mode that the Business User will interact with initially, subsequent to all previous steps (where the Technical User sets up the Matrix and Surfaces). In this state, the Business User can drag and drop any of the available Software Consumable (labeled "Decals" in this exhibit), onto any of the surfaces. A green arrow 108 (overlaid for illustrative purposes only since it does not appear in the user interface) shows the mouse path of the Business User dragging and dropping the Consumable onto a surface, and the resulting Consumable appearing on the surface is shown at the pointed end of the arrow.

Figure 9:
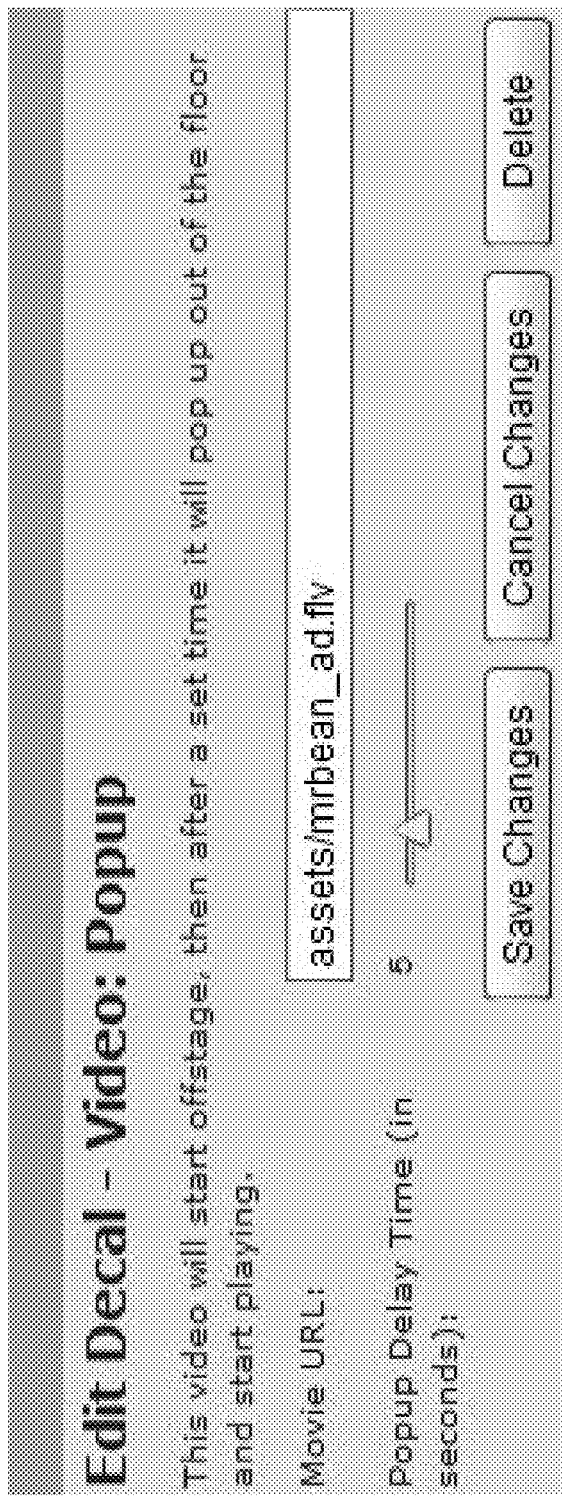
FIG. 9 illustrates a pop-up window of the interface process of the method shown in FIG. 2.

FIG. 8 shows the interface mode that the Business User will interact with when editing Consumables that have been created by the Business User. In the consumables portion 102, a list 110 of the placed Consumables (consumables placed in the image 70), grouped by which Surface they are on is displayed. This figure illustrates a Software Consumable being hovered over with the mouse. It uses a similar method of synchronized selection that is used in FIG. 4 so that when the user hovers over the either a consumable in the list of placed Consumables or the actual consumable as shown on the image 70, both are highlighted. When the Business User clicks on a Consumable, it will open a form (FIG. 9) prompting the Business User to enter the value of the parameters for that Consumable such as the title, description, and parameters that appear on this form.

Figure 10:
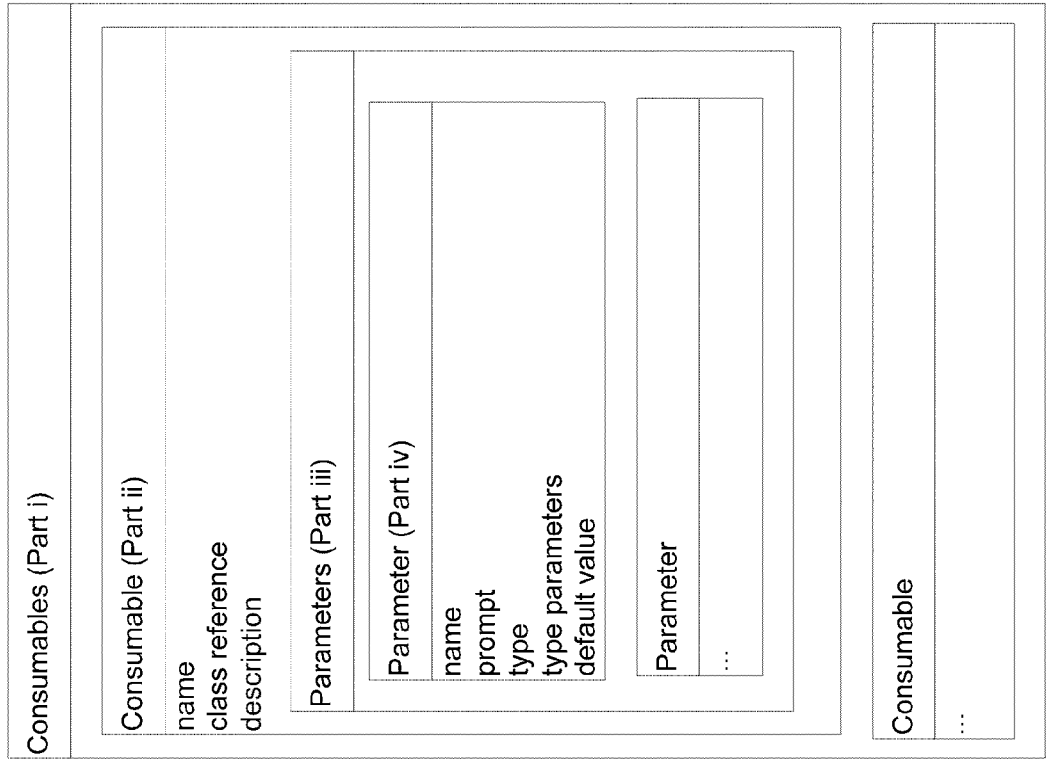

FIGS. 10 and 11 illustrate an object model 110 of the system for placing content in a 3D environment in which FIG. 10 illustrates the object model that shows how Consumable definitions are stored and handled by the application. This repository can be expressed in any object-oriented notation, such as but not limited to XML. FIG. 11 depicts how placed Consumables are stored in the application and grows as the Business User interacts with the system and essentially describes the result of all of the activity performed by the Business User. The "parent id" field shown in FIG. 11 refers to the parent surface, however the Construction Application can be used to construct Final Applications where consumables can be placed not only on the surface, but in fact a Consumable can be placed onto another Consumable, in which case, the parent id refers to the memory address (ID) of the parent consumable. FIG. 11 also shows a language code parameter for a consumable/piece of content that allows the language of the consumable/piece of content to be defined in the object model, but also allow the language of the consumable/piece of content to be changed easily without having to redefine the object model for the consumable/piece of content.

Figure 12:
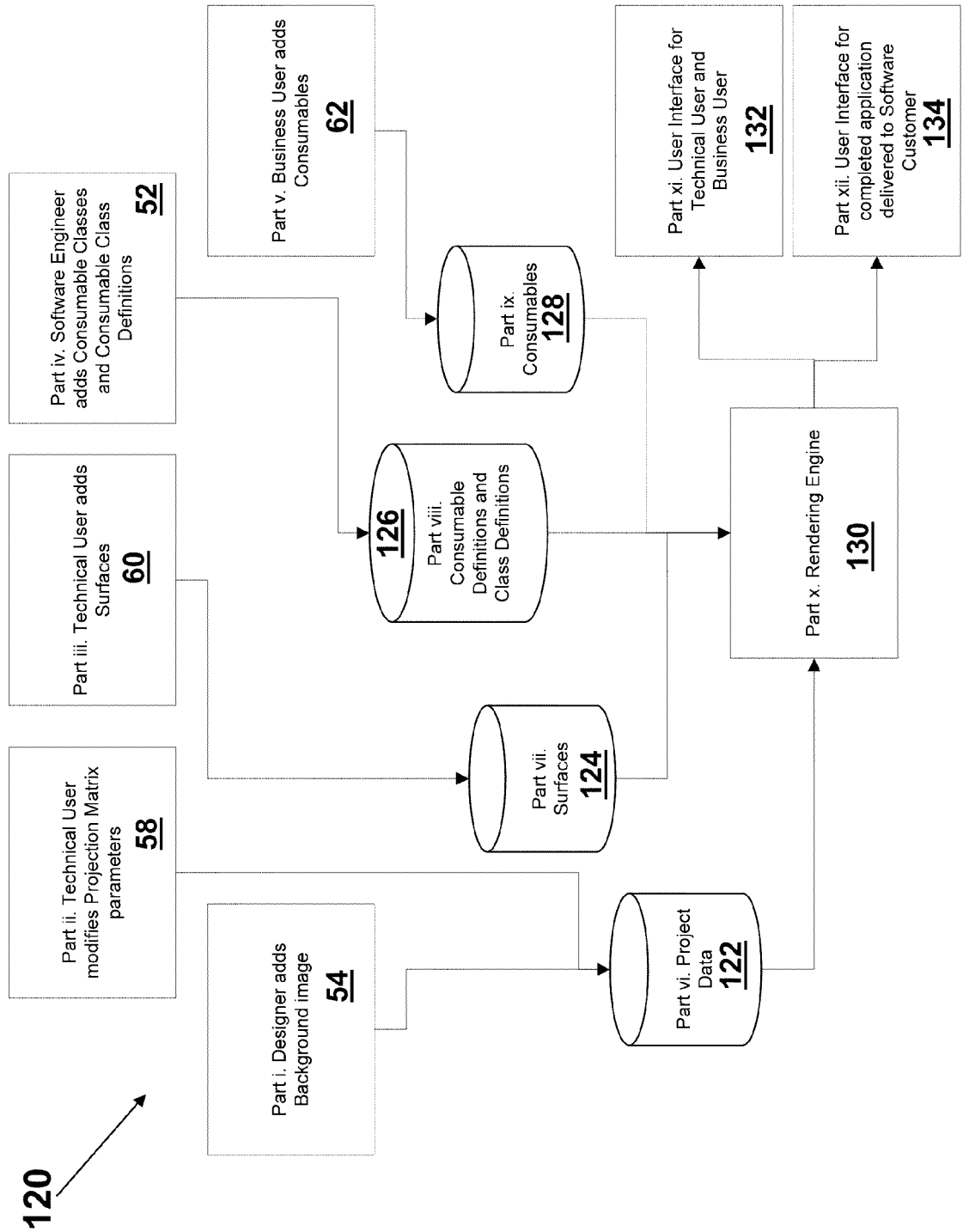
FIG. 12 illustrates more details of the data repositories and user actions in the system for placing content in a 3D environment.

FIG. 12 illustrates more details of the data repositories and user actions in the system for placing content in a 3D environment. The Construction Application and the Final Application both use data structures to store information necessary for the applications to know what to do and the data structure is shared between both applications. The repository may be implemented using a software based database system running on a computer that also hosts the tool 46 described above, but may also be implemented in hardware. The repository 120 may include a project data repository 122, a surfaces repository 124, a consumable definition and class definition 126 and a consumables repository 128.

The repository 126 that stores the definition of the Consumables is setup prior to application execution by the programmer and must contain at least one Consumable defined before the Business User can start to use the system. The repository 126 is fixed at the time that the application runs, and should not change during the runtime of the application. To use this repository 126, first the programmer of the Consumable writes a Class (as defined in Computer Science) that implements a particular Consumable as desired. Then, the programmer creates a new object that defines the implemented Consumable, and adds that object to the Consumables repository 128 that may contain an unlimited number of Consumables. Each Consumable should define a name and description to display to the user and each of the parameters are defined for the purpose of setting up the form, prompting the user for the appropriate parameters, providing the correct form control associated with each parameter, and for the system to know how to store the data after the business user has completed the form entry.

The repository that stores the Business User's input into the system is constructed while the Business User edits Consumables as described above in FIG. 3.

FIG. 12 also illustrates the interaction between the user actions (processes 52-62 as described with respect to FIG. 3), the data repositories 122-128, a rendering engine 130, a user interface 132 for the technical user and business user described above and a user interface 134 for the completed 3D application (the Final Application) delivered to the customer. The Final Application 134 is visually a subset of the Construction Application (132) because the Construction Application is a WYSIWYG editor. However, it is possible that more functionality is available in the Final Application because a Software Consumable can have a different "design mode" functionality than "release mode" functionality. An example of a completed Final Application could be a chat room that contains chat panels and related options in the form of buttons and other common user interface controls. The project data repository 122 stores all data and metadata for the application that all users are working to produce while the surfaces repository 124 stores all surface data. The consumables definition repository 126 stores source code or compiled binary software in the form of Class definitions, and data outlined in FIGS. 10 and 11. The consumables repository 128 stores the placement and parameters of all Consumables added by the Business User and data.

The rendering engine 130 consumes and aggregates data from all data sources and is used by all applications for displaying the completed results on the screen in an interactive manner. The rendering engine starts by rendering the background image in 122 as is. Then, the rendering engine looks at all of the surfaces and creates invisible (or visible if the Construction Application is in Surface Editing mode) viewports (rectangular regions) on the screen where the consumables will go. The 3D or 2D positions of these view ports are calculated by looking at the coordinates of the Surfaces in 124, and factoring in the Projection Matrix in 122, and using standard 3D projection computer algorithms for projecting the viewport onto the 2D computer monitor display. Then, the rendering engine looks at each consumable from 128 that is associated with each surface (which is now represented by a viewport). It places the consumable onto the viewport, again using standard 3D algorithms for knowing how to translate each consumable onto the pixels of the display monitor, given the position of the viewport and the position of the placed consumable. During this process, the rendering engine also combines the placed consumable from 128 with the consumable definition from 126 by creating an instance of the class (es) defined in 126 and then placing the parameters defined by the placed consumables into the consumable instance. Finally, the rendering engine instructs the consumable instance to render itself onto the calculated position of the viewport with the parameters given by the business user 62.

The user interfaces 132 represents the application logic and user interface logic for constructing the application as described above and the user interface 134 represents the Final Application that the Construction Application is purposed to create and is used by the Software Customer and all end-users of the Final Application.

The system and method described above may be used to generate a 3D application (the Final Application) that can be embedded into a collaboration system enabling many simultaneous end-users to attend a virtual event. In one embodiment, either the Construction Application or Final Application or both can be implemented using Rich Internet Application Platforms including but not limited to Adobe Flash and Microsoft Silverlight (the two most common in the industry). The advantage to doing this is that the application(s) become a no-download, ubiquitous solution. However, the system may also be implemented using other technologies.

As a result of the above-described system and method, non-Technical Users are able to add, edit, and delete content placed in a 3D world simply with a drag and drop so that applications can be created by the users who need them, instead of requiring programmer intervention. The system also provides a meta-programming environment that enables applications to be created from the ground up by defining high-level modeling aspects instead of source code wherein the meta-programming environment is a system of drag-and-drop, and form editing. In addition, software consumables that are created for an application built using the Construction Application can be reused interchangeably within other applications. For example, if there is a specific media player that is written by a programmer and included in the management tool provided to the user for the purpose of one specific application, that media player can be reused in other applications created by other business users without the need for a programmer to take action to enable the media player to be reusable.

The system also provides a way to create applications without writing code line-by-line and shortens the traditional edit-compile-test-run development life cycle. In addition, developers and Business Users readily share and modify Consumables and improve on each others' work. Furthermore, the Software Programmer who creates Software Consumables (for use by the Business User) does not need to have 3D programming expertise and the Business User does not need to have any 3D expertise; dragging to a 3D surface requires no more skills than ordinary dragging and dropping in a computer software application.

An application run-time platform executed on a computer system that runs the three-dimensional application. This application run-time platform is a functional subset of the application described as the Construction Application above. The application run-time is conceptually similar to how the Adobe PDF Reader displays exactly the same thing that you can see in Microsoft Word or other editor when you are creating a PDF file. One point of separating this as another application is to reduce codesize which is good for speeding up the load time of the application and reducing bugs and security vulnerabilities. Also, the application run-time can be implemented to be a reusable platform so that if multiple applications are created using the Construction Application, this run-time platform only has to be loaded once and can power all of the applications that are created using this invention.

An example of an embodiment of the above system and method is to allow a business user to interact with a virtual show (implemented using the 3D image) and add one or more software consumables/content into the virtual show. An example of that embodiment is shown in FIGS. 4-8 that shows the lobby for a virtual show being modified to add one or more software consumables/content into the virtual show.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system for generating an application, comprising:
a computer system that executes a construction tool that is used by a technical user and a business user to generate an application in a three dimensional environment;
a repository associated with the computer system that stores the data associated with the construction tool and the application in the three dimensional environment, wherein the repository further comprises a consumable object for each piece of content, wherein the consumable object further comprises a language code parameter that contains a language for the consumable object wherein the language code parameter permits the language of the consumable object to be changed without changing one or more other parameters of the consumable object;
an application run-time platform executed on the computer system that runs the application in the three dimensional environment;
an end user application that includes the application in the three dimensional environment and the application run-time platform; and wherein the construction tool further comprises a projection matrix component that adjusts a projection matrix to align the application with a three-dimensional image, wherein the projection matrix component clips and scales the projection matrix to align the application with the three-dimensional image and an authoring component that places one or more consumable onto the three-dimensional image to generate the application in the three dimensional environment that has the three dimensional image and one or more consumables wherein the one or more consumables maintain perspective relative to the three dimensional image.

2. The system of claim 1, wherein the projection matrix component further comprises a drag pad that is a tool that controls one or more variables of the projection matrix.

3. The system of claim 1, wherein the construction tool further comprises a drag pad wherein the drag pad has a first control axis and a second control axis wherein a first variable is assigned to the first control axis so that a value of the first variable is controlled using the first control axis and a second variable is assigned to the second control axis so a value of the second variable is controlled using the second control axis using the drag pad.

4. The system of claim 3, wherein the drag pad further comprises a user interface component of the construction tool wherein the first control axis further comprises a right side and a left side of the user interface component that are manipulated by the user to change the value of the first variable and the second control axis further comprises a top side and bottom side of the user interface component that are manipulated by the user to change the value of the second variable.

5. The system of claim 1, wherein the three dimensional image is an image of a virtual show and wherein the one or more consumables are objects placed into the virtual show so that the user can interact with the virtual show.

6. The system of claim 1, wherein the three-dimensional application further comprises a Flash® implemented three-dimensional application that does not require a download.

7. The system of claim 1, wherein the construction tool further comprises a surface editing component that allows the technical user to add one or more surfaces on top of the three-dimensional image and wherein the authoring component allows the business user to place the one or more consumables onto the one or more surfaces to generate the three dimensional application that has a three dimensional image, one or more surfaces and the one or more consumables.

8. The system of claim 7, wherein the surface editing component further comprises a drag pad that is a tool that controls one or more variables of one or more surfaces being editing using the surface editing component.

9. The system of claim 1, wherein the authoring component allows the user to one of add, delete and modify the one or more consumables.

10. A method generating an application, comprising:

providing, executed on a computer system, a construction tool that is used by a technical user and a business user to generate an application in a three dimensional environment;

storing, in a repository associated with the computer system, data associated with the construction tool and the application in the three dimensional environment, wherein the data in the repository further comprises a consumable object for each piece of content, wherein the consumable object further comprises a language code parameter that contains a language for the consumable object wherein the language code parameter permits the language of the consumable object to be changed without changing one or more other parameters of the consumable object;

adjusting, by a technical user using a projection matrix component that is part of the construction tool, a projection matrix to align the application with a three-dimensional image, wherein adjusting the projection matrix further comprises clipping and scaling the projection matrix to align the application with the three-dimensional image;

placing, by a business user using an authoring component that is part of the construction tool, one or more consumable onto the three-dimensional image to generate the application in the three dimensional environment that has the three dimensional image and one or more consumables wherein the one or more consumables maintain perspective relative to the three dimensional image.

11. The method of claim 10 further comprising controlling one or more variables of the projection matrix using a drag pad.

12. The method of claim 10 further comprising controlling one or more variables using a drag pad wherein the drag pad has a first control axis and a second control axis wherein a first variable is assigned to the first control axis so that a value of the first variable is controlled using the first control axis and a second variable is assigned to the second control axis so a value of the second variable is controlled using the second control axis using the drag pad.

13. The method of claim 10 further comprising adding, by a technical user using a surface editing component that is part of the construction tool, one or more surfaces on top of the three-dimensional image and wherein the authoring component allows the business user to place the one or more consumables onto the one or more surfaces to generate the three dimensional application that has a three dimensional image, one or more surfaces and the one or more consumables.

14. The method of claim 13 further comprising using a drag pad to control one or more variables of one or more surfaces being editing using the surface editing component.

* * * * *